United States Patent [19]

Takada et al.

[11] Patent Number: 4,726,746

[45] Date of Patent: Feb. 23, 1988

[54] ELECTRICALLY-OPERATED FUEL PUMP

[75] Inventors: Shigetaka Takada; Masaaki Nomura; Satoshi Kondoh, all of Obu, Japan

[73] Assignee: Asian Kogyo Kabushiki Kaisha, Obu, Japan

[21] Appl. No.: 912,116

[22] Filed: Sep. 29, 1986

[30] Foreign Application Priority Data

Oct. 3, 1985 [JP] Japan .............................. 60-151884[U]

[51] Int. Cl.[4] ........................ F04B 17/00; F04B 35/00
[52] U.S. Cl. ................................. 417/423 R; 417/366
[58] Field of Search .......... 417/423 R, 423 T, 423 H, 417/366, 357, 424 A, 371, 424 R

[56] References Cited

U.S. PATENT DOCUMENTS

| | | | |
|---|---|---|---|
| 4,307,617 | 12/1981 | Greer et al. | 323/368 |
| 4,310,172 | 1/1982 | Claude et al. | 91/390 |
| 4,520,296 | 5/1985 | Lepper et al. | 318/282 |
| 4,656,873 | 4/1987 | Stewart | 73/861.33 |

FOREIGN PATENT DOCUMENTS

| | | | |
|---|---|---|---|
| 2398435 | 3/1979 | France | 417/423 R |
| 56-88982 | 7/1981 | Japan . | |

*Primary Examiner*—Carlton R. Croyle
*Assistant Examiner*—Timothy S. Thorpe
*Attorney, Agent, or Firm*—Dennison, Meserole, Pollack & Scheiner

[57] ABSTRACT

Disclosed is an electrically-operated fuel pump for pumping fuel such as gasoline, light oil and heavy oil, comprising a pump housing; a motor having a rotating shaft and encased centrally in the pump housing, the motor comprising a rotor formed by fixing a permanent magnet to the rotating shaft thereof and a stator arranged around the rotor, the stator having plural windings of coils adapted to be sequentially excited to rotate the rotor; a pump section encased in the pump housing below the motor and operatively connected to the rotating shaft of the motor; and an electric circuit package made of an oil-resistant and water-resistant material and incorporated in the pump housing above the motor, the electric circuit package oil-tightly incorporating a plurality of rotor position detecting devices for detecting an angular position of the rotor, wherein a portion of the electric circuit package facing to the rotor is made of a paramagnetic material.

9 Claims, 3 Drawing Figures

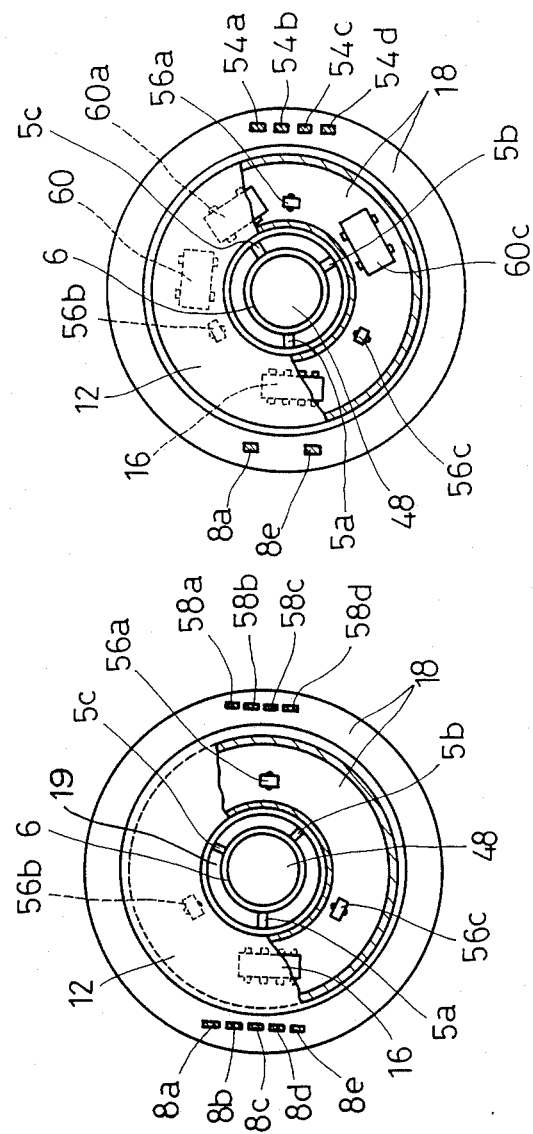

ELECTRICALLY-OPERATED FUEL PUMP

BACKGROUND OF THE INVENTION

The present invention relates to a fuel pump for pumping fuel such as gasoline, light oil and heavy oil from a discharge port.

In a known form of fuel pump, a pump section and a motor are assembled as a unit, and fuel is sucked from a suction port into the motor and is discharged from the discharge port. In the fuel pump of this type, there occurs a problem of wear of a commutator. To solve this problem, a brushless motor has been utilized as disclosed in Japanese Laid-Open Patent Publication No. 56-88982.

In operation of the brushless motor, it is necessary to provide an electric circuit for detecting an angular position of a rotor, deciding which coil of a stator is to be excited according to the detection, and switching on and off the excitation of the coil according to the decision. It will be noted that at least a rotor position detecting device must be incorporated in the fuel pump. Further, for ease of handling, it is preferable to incorporate the entire electric circuit including the rotor position detecting device in the fuel pump. However, in incorporating the entire electric circuit in the fuel pump, installation method of the rotor position detecting devices and oil resistance of the electric circuit have to be considered.

SUMMARY OF THE INVENTION

Accordingly, it is a primary object of the present invention to provide an electrically-operated fuel pump which may ensure durability of the oil-tight construction of an electric circuit package.

It is another object of the present invention to provide an electrically-operated fuel pump which may reliably prevent penetration of oil from an electrical connecting portion between the inside and outside of the electric circuit package having a conductor pattern printed on a substrate.

It is a further object of the present invention to provide an electrically-operated fuel pump which may oil-tightly incorporate a rotor position detecting device in the electric circuit package to render the construction simple.

It is a still further object of the present invention to provide an electrically-operated fuel pump which may maintain oil-tightness even if a pin hole is generated, and which may utilize the advantage of the brushless motor.

According to the present invention, there is provided an electrically-operated fuel pump for pumping fuel such as gasoline, light oil and heavy oil, comprising a pump housing; a motor having a rotating shaft and encased centrally in the pump housing, the motor comprising a rotor formed by fixing a permanent magnet to the rotating shaft thereof and a stator arranged around the rotor, the stator having plural windings of coils adapted to be sequentially excited to rotate the rotor; pump means encased in the pump housing below the motor and operatively connected to the rotating shaft of the motor; and an electric circuit package made of an oil-resistant and water-resistant material and incorporated in the pump housing above the motor, the electric circuit package oil-tightly incorporating a plurality of rotor position detecting devices for detecting an angular position of the rotor, wherein a portion of the electric circuit package facing to said rotor is made of a paramagnetic material. Especially, the electric circuit package comprises a substrate, a cap oil-tightly fixed to the substrate, the substrate extending outwardly from the outer periphery of the cap, and a conductor pattern printed on the substrate for electrical connection.

The invention will be more fully understood from the following detailed description and appended claims when taken with the drawings.

BRIEF DESCRIPTION OF THE DRAWINGS

FIG. 2 is a cross section taken along the line II—II in FIG. 1; and

FIG. 3 is a sectional view similar to FIG. 2, showing a modified embodiment according to the present invention.

DETAILED DESCRIPTION OF THE PREFERRED EMBODIMENTS

Figure 1:
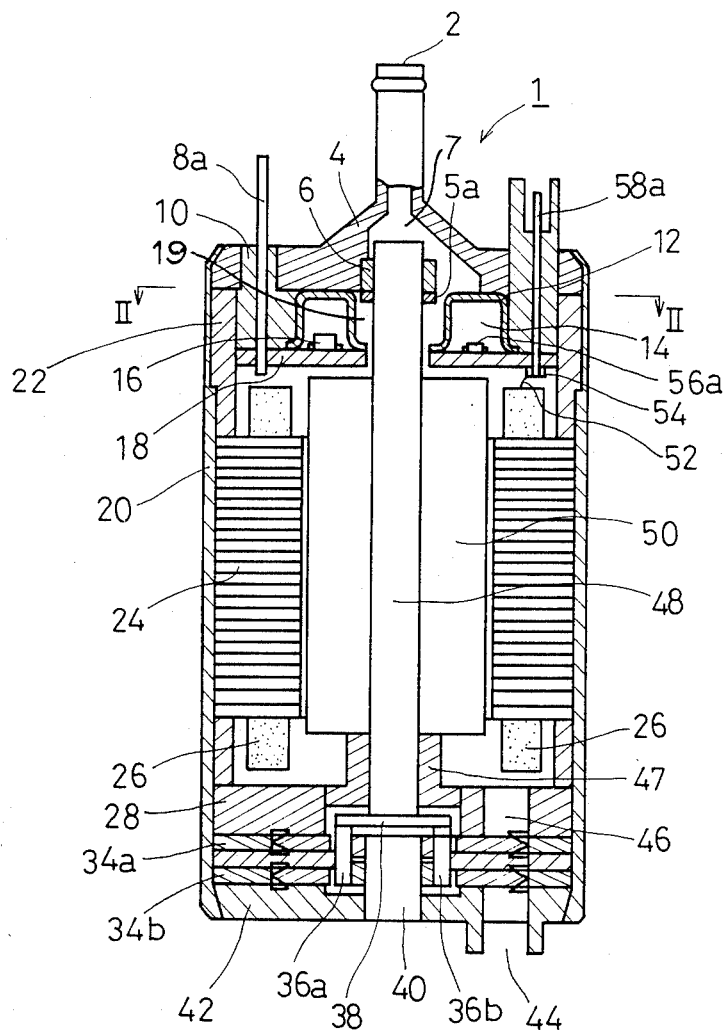
FIG. 1 is a vertical sectional view of a preferred embodiment according to the present invention.

Referring to FIGS. 1 and 2 showing a preferred embodiment of the present invention, reference numeral 1 generally designates a fuel pump formed by an upper end plate 4, a lower end plate 42 and a side wall 20. The upper end plate 4 is formed with a discharge port 2 and fuel conduit 7, while the lower end plate 42 is formed with a suction port 44. The interior of the pump 1 is partitoned by a partition wall 28 to define a motor chamber on an upper side thereof. A rotating shaft 48 of a motor is rotatably supported at its one end by a bearing 6 fixed to the upper end plate 4 through three arms 5a, 5b and 5c, and is also rotatably supported at the other end by a bearing 47 fixed to the partition wall 28. The rotating shaft 48 is fixedly inserted into an axial through-hole of a cylindrical permanent magnet 50 radially magnetized to form a rotor of the motor. A stator 24 formed of a ferromagnetic material is arranged around the rotor, extending in the axial direction thereof. The stator 24 is formed with six poles projecting inwardly toward the rotor. Coils 26 are wound around the poles of the stator 24. The coils 26 are electrically connected to each other and to a common wire in such a manner that the opposite poles are simultaneously excited. Accordingly, electrical connection to the coils 26 is effected by the windings of three phases and the common wire.

A support disc 38 is fixed to the lower end of the rotating shaft 48, and is formed with two arms 36a and 36b extending downwardly from the opposite positions thereof. The arms 36a and 36b are engaged with two impellers 34a and 34b to rotate the same about a shaft 40 fixed to the lower end plate 42. When the impellers 34a and 34b are rotated, oil is sucked from the suction port 44, and is fed through a passage 46 to the motor chamber.

An electric circuit package 14 is provided on the upper side of the motor. The electric circuit package 14 includes a ceramic substrate 18 and a substantially doughnut-shaped metal cap 12 fixed to the upper surface of the ceramic substrate 18. An annular space 19 between rotor 48 and circuit package 14 forms part of the fuel passage through the pump. Three Hall devices 56a to 56c and a control device 16 are mounted on the ceramic substrate 18 in the electric circuit package 14 by soldering as applied in known hybrid ICs. The control device 16 compares outputs from the Hall devices 56a to 56c with a reference voltage and feeds a signal to a switching device of the coil to be excited. Electrical connection of each device to a power supply and a signal line is formed by printing a conductor of desired pattern on the ceramic substrate 18. A set of five connector pins 8a to 8e are provided at a portion of the substrate 18 outside the extent of the cap 12. The connectors 8e and 8e are connectors to be connected to a power supply, while the connectors 8b to 8d are signal connectors to be connected to a base of a power transistor (not shown) located outside the pump for switching the three phases of the coil 26. Electrical connection of the connector pins 8a to 8e to the Hall devices 56a to 56c and the control device 16 is formed by printing a conductor pattern on the substrate 18. The ceramic substrate 18 is brazed to the metal cap 12 by using low-melting glass to ensure oil tightness therebetween. As a result, the electric circuit package 14 may be maintained oil-tight reliably for a long time. A space defined between the cap 12 and a support cylinder 22 is molded by plastics 10, so as to position the electric circuit package 14 and stabilize the connectors 8a to 8e and electrodes 58a to 58d to be described. The electrodes 58a to 58d pass through the ceramic substrate 18, and are connected with electrodes 54 which are connected through cords 52 to the coils 26. The electrodes 58a to 58d are merely inserted through the ceramic substrate 18, and are not connected with the electric circuit package 14.

Although the Hall devices 56a to 56c are arranged in opposed relation to the permanent magnet 50 with the ceramic substrate 18 interposed therebetween, they may sufficiently exhibit a rotor position detecting function if a thickness of the ceramic substrate 18 is about 2 to 3 mm. Materials of the substrate 18 are not limited to ceramics, but they may include a paramagnetic material such as aluminium and stainless steel. The cap 12 may be formed of a water-resistant and oil-resistant material which may include ceramics.

Although the substrate 18 is fixed to the cap 12 by brazing with the use of a low-melting glass in the foregoing embodiment, the substrate 18 may be fixed to the cap 12 by printing a conductor pattern on the substrate 18, laminating a ceramic board on the conductor pattern, applying metal sputtered on the ceramic board, and welding a metal cap to the sputtered metal layer.

In operation, the rotor position detecting device determines which coil should be excited, and feeds a signal to the switching device to rotate the motor. As a result, fuel is sucked from the suction port 44 into the motor chamber, and is fed through a gap between the rotor and the coil to the discharge port 2.

The process of fixing the substrate 18 to the cap 12 may be carried out in an atmosphere under pressure equal to or slightly higher than a pumping pressure (about 2 kg/cm$^2$). In this case, since pressure in the electric circuit package 14 is equal to or slightly higher than the pumping pressure, fuel will not penetrate into the electric circuit package 14 even if a pin hole is formed through the cap 12. Thus, the oil tightness is obtained more reliably. Although this effect is, of course, obtained by sealing air in the electric circuit package 14, it is more effective to seal preferably gel silicone in the electric circuit package 14.

Referring to FIG. 3 which shows another preferred embodiment, three power transistors 60a to 60c are mounted in the electric circuit package 14 to switch on and off excitation of the coils 26. The power transistors 60a to 60c are connected to each other by means of a conductor pattern printed on the substrate 18. In this case, the substrate 18 is formed of preferably aluminium surface-treated to permit radiation from the power transistors 60a to 60c. The substrate 18 includes connectors 8a and 8e connected to a power supply and connectors 54a to 54d connected to the coil. In this embodiment, it is not necessary to provide the signal connectors 8b to 8d connected to the power transistor outside of the pump and the electrodes 58a to 58d for supplying current from the power transistor to the coils.

Having thus described the preferred embodiment of the invention, it should be understood that numerous structural modifications and adaptations may be made without departing from the spirit of the invention.

What is claimed is:

1. An electrically-operated fuel pump for pumping fuel such as gasoline, light oil and heavy oil, comprising a pump housing having a fuel suction port at its bottom surface, a fuel discharge port at its top surface, and conduit means therebetween for passing fuel through said housing; a motor having a rotating shaft and encased centrally in said pump housing, said motor comprising a rotor formed by fixing a permanent magnet to said rotating shaft thereof and a stator arranged around said rotor, said stator having plural windings of coils adapted to be sequentially excited to rotate said rotor; pump means encased in said pump housing below said motor and operatively connected to said rotating shaft of said motor; and an electric circuit package made of an oil-resistant and water-resistant material and incorporated in said pump housing above said motor, said electric circuit package oil-tightly incorporating a plurality of rotor position detecting devices for detecting an angular position of said rotor, said rotating shaft of said motor being inserted through said electric circuit package with an annular space defined between said rotating shaft and said package, the annular space comprising a portion of said conduit means, wherein a portion of said electric circuit package facing to said rotor is made of a paramagnetic material.

2. The electrically-operated fuel pump as defined in claim 1, wherein said electric circuit package comprises a substrate, a cap oil-tightly fixed to said substrate, said substrate extending outwardly from the outer periphery of said cap, and a conductor pattern printed on said substrate for electrical connection.

3. The electrically-operated fuel pump as defined in claim 1, wherein said electric circuit package seals gas or liquid having pressure equal to or slightly higher than a pumping pressure.

4. The electrically-operated fuel pump as defined in claim 1, further comprising a power transistor provided outside said electric circuit package for switching on and off excitation of said coils.

5. The electrically-operated fuel pump as defined in claim 1, further comprising a power transistor provided inside said electric package for switching on and off said coils.

6. The electrically-operated fuel pump as defined in claim 1, wherein said rotor position detecting devices comprise a Hall devices.

7. The electrically-operated fuel pump as defined in claim 3, wherein said gas sealed in said electric circuit package is air.

8. The electrically-operated fuel pump as defined in claim 3, wherein said liquid sealed in said electric circuit package is gel silicone.

9. The electrically-operated fuel pump as defined in claim 1, wherein said electric circuit package comprises a substrate having an electrically conductive pattern printed on a surface thereof, and a central passage therethrough; a plurality of rotor position detecting devices mounted on said surface, each said device being operatively connected by said pattern; an annular cap oiltighly fixed to said substrate and enclosing said devices, said cap having a central passage aligned with the central passage of said substrate; at least a portion of said substrate extending outwardly beyond said cap, said portion including a portion of said pattern having electrical connection means attached thereto.

* * * * *